United States Patent Office 3,097,020
Patented July 9, 1963

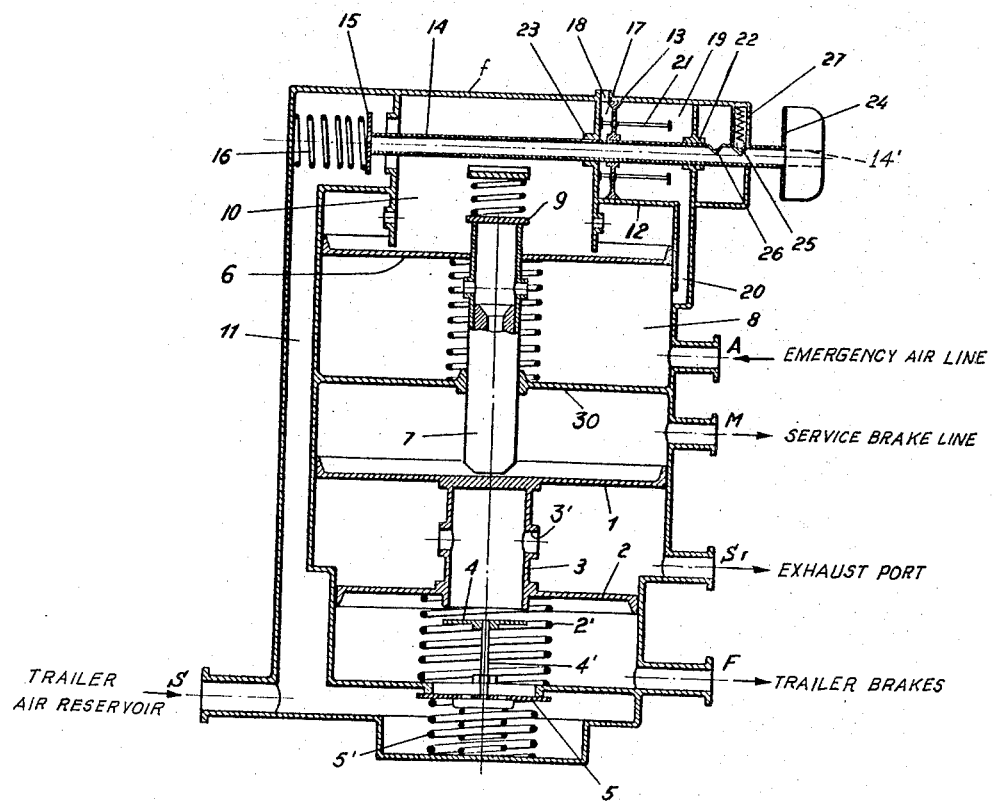

3,097,020
PNEUMATIC DEVICE TO BRAKE OR UNBRAKE A TRAILER
Giuseppe Alfieri, Milan, Italy, assignor to Fabbrica Italiana Magneti Marelli S.p.A., Milan, Italy, a firm
Filed May 18, 1960, Ser. No. 29,875
Claims priority, application Italy June 12, 1959
3 Claims. (Cl. 303—29)

The present invention relates to a pneumatic brake releasing and braking device for trailers of the type incorporating an automatic relay valve, wherein brake releasing and braking of an isolated trailer are manually obtained, while on the other hand, when the trailer is recoupled to the motor vehicle, the return of the braking device into the position corresponding to the isolated trailer braking position is obtained by means of the motor vehicle emergency air supply source.

The system of trailer braking by means of an automatic relay valve is well known, the automatic relay valve being mounted on the trailer and pneumatically connected to the motor vehicle by means of a service brake line and an emergency air supply line. The service brake line feeds the service piston operating chamber during pneumatic braking phases of the motor vehicle, while the emergency air supply line, always under pressure, is in communication with the trailer air reservoir tank. A pneumatically balanced emergency relay piston insures, in the event of uncoupling of the trailer from the motor vehicle, or accidental disengagement, the automatic braking of the trailer due to pneumatic unbalance occurring on said piston caused by the elimination of the emergency air pressure.

Normally, automatic relay valves are furnished with a hand control device with which it is possible to effect brake release, and braking of the isolated trailer, and hence, give this vehicle desired maneuverability and movement.

An object of the present invention is to provide a new device of this type being of simple construction and having a secure operating efficiency.

The device is characterized by the fact that it is located in the operating chamber of the emergency relay piston, and at a given position puts the emergency relay piston operating chamber in communication with the trailer air reserve tank, and at another given position, intercepts said communication to allow the aforesaid operating chamber to exhaust into the outer atmosphere.

The invention will be illustrated with reference to the attached drawings, which is given only as an example to show a preferred embodiment of the device.

In the drawings:

FIG. 1 is a schematic view of the automatic relay valve with the brake release and braking device under the condition where the trailer is coupled to the motor vehicle; and FIG. 2 is a schematic view of the device in the position of brake release of the isolated trailer.

Referring to the drawings and more particularly to FIG. 1, the automatic relay valve comprises a housing 29 provided with a transverse partition 30. On one side of the partition, the housing is provided with a port A which connects the automatic relay valve to the vehicle emergency air line and on the other side of the partition 30, the automatic relay valve is connected to the service brake line, to atmosphere, and to the trailer brakes through ports M, $S_1$ and F, respectively. The automatic relay valve is connected to the trailer air reservoir (not shown) through port S, to be described more fully hereinafter.

A service piston 1 is slidably mounted within the housing between ports M and $S_1$, said piston being actuated in response to the compressed air flowing through the service brake line port M. A second piston 2 is rigidly connected to the service piston by means of a hollow rod 3 having an open end and provided with radial ports 3'. The open end of the hollow rod 3 provides a seat for an exhaust valve 4 connected to one end of a stem 4' slidably mounted within the housing, the opposite end of the stem carrying an inlet valve 5 biased to closed position by spring 5'. A spring 2' is provided biasing piston 2 upwardly thereby maintaining the exhaust valve 4 in open position.

By this construction and arrangement, when the vehicle brake pedal is actuated, compressed air entering the service brake port M forces the service piston 1 downwardly thereby closing the exhaust valve 4 and opening the inlet valve 5. Thus, compressed air flows through the trailer air reservoir port S, through the open inlet valve 5 and through the port F to thereby brake the trailer.

When the vehicle brake pedal is released, the spring 2' will move the service piston 1 upwardly; thus, opening the exhaust valve 4 and spring 5' will bias the inlet valve 5 to a closed position, whereby air from the brakes flows through port F, the radial ports 3' and is exhausted to the atmosphere through port $S_1$.

An emergency air relay piston 6 is slidably mounted within the housing to thereby form with the partition 30, a chamber 8, said chamber being in communication with the emergency air line through port A. A hollow push rod 7 provided with radial ports 7' is carried by the emergency relay piston 7 and extends through an opening formed in the partition 30; one end of the push rod being positioned in proximity to the service piston 1 and the other end of the push rod being provided with a spring biased check valve 9. A spring 6' is mounted between the partition 30 and the emergency relay piston 6 biasing the piston and the push rod 7 upwardly in a direction away from the service piston 1. One end $f$ of the housing, together with the piston 6, forms a feed chamber 10 which is placed in communication with the trailer reservoir through conduit 11 and port S. Thus, compressed air is fed to the trailer air reservoir from port A, through chamber 8, radial ports 7', check valve 9 and conduit 11.

The trailer manual brake release and braking device, according to the present invention, is installed in the feed or operating chamber 10, and comprises, essentially, a cylinder 12 having a piston 13 slidably mounted therein, said piston carrying a tubular rod 14 which extends through openings 22 formed in the ends of cylinder 12, each opening being provided with suitable seal means 23 through which the rod 14 is adapted to slide. One end of the tubular rod is adapted to actuate a valve disc 15 biased to closed position by a spring 16, the opposite end of the tubular rod being provided with a handle 24 whereby the valve 15 may be manually actuated by either pushing or pulling the tubular rod 14. Thus, when the rod is pushed inwardly, the valve 15 is opened thereby placing chamber 10 into communication with the conduit 11 and when the rod is pulled outwardly, the valve 15 is biased to closed position and the chamber 10 is placed into communication with the atmosphere through the hollow rod 14 and port 14' formed in the handle 24. Spring biased detent means 27 is provided adjacent one end of the cylinder 12 adapted to retain the rod 14 in either of two predetermined positions, one of which is shown in FIG. 1 wherein the detent means engages a notch 25 formed in the rod and the other position shown in FIG. 2 wherein the detent means engages a notch 26 formed in the rod 14.

The piston 13 divides the cylinder 12 into two chambers 17 and 19, chamber 17 being open to the atmosphere through aperture 18, and chamber 19 communicating with the emergency air line through conduit 20, chamber 8 and port A. The cylinder 12 is provided with guide means 21 on which the piston 13 is slidably mounted, whereby the piston is not only guided in its reciprocatory movement but also the reciprocatory displacement of the piston is limited.

As mentioned hereinabove, the automatic relay valve is shown in FIG. 1 under conditions when the trailer is coupled to the motor vehicle, wherein the emergency relay piston 6 is in pneumatic balance, therefore, the end of the push rod 7 is spaced from the service piston 1; the inlet valve 5 is closed and the trailer braking elements are in communication with the atmosphere through exhaust valve 4 and exhaust port $S_1$.

When effecting braking of the vehicle with the motor vehicle control distributor, compressed air is fed to the service line, with a subsequent feeding of the operating chamber of the service piston 1, thus moving the service piston downwardly to close the exhaust valve 4 and opening the inlet valve 5.

The result is, therefore, that both while in motion and in the braking phases, feed chamber 19 in the cylinder 12 is permanently fed by the compressed air flowing through the port A connected to the emergency line. It follows, therefore, that piston 13 and rod 14 are displaced toward the left, as viewed in FIG. 1, and valve 15 being open places chamber 10 in communication with the trailer reservoir tank through the port S.

In the above mentioned phases, the manual control device does not modify the normal pneumatic connections of the automatic relay valve, and therefore can be considered in all practical functions of the operation as not being mounted on the apparatus. Its functioning, on the other hand, occurs when the trailer is isolated from the motor vehicle.

When the trailer is disengaged from the motor vehicle, chamber 8 is open to atmosphere through port A, thus compressed air from the trailer air reservoir acts on piston 6 together with push rod 7 thereby displacing the service piston 1, whereby the exhaust valve 4 closes and the inlet valve 5 opens, thus feeding air to the trailer braking elements through port F.

In this condition, the trailer is blocked, and the device is held to the left, as viewed in FIG. 1, by the detent means engaged in the notch 25.

When it is desired to release the brakes of the isolated trailer, the rod 14 is pulled outwardly, to the right as viewed in FIG. 2, thus causing the closure of valve 15 thereby cutting off communication between the trailer air reservoir connected to the port S and the chamber 10. The chamber 10 is vented to the atmosphere through the rod 14. As a result, spring 6' biases the mergency relay piston 6 and associated rod 7 upwardly; the spring 2' biases the service piston 1 upwardly thereby opening the exhaust valve 4 and closing the inlet valve 5. The compressed air from the trailer brakes then exhausts to the atmosphere through ports F and $S_1$, to thereby release the trailer brakes.

The rod 14 is maintained in this position, i.e., to the right as viewed in FIG. 1, by means of the detent 27 engaged in the notch 26.

In order to brake the trailer again, it is only necessary to push the rod inwardly, to the left as viewed in FIG. 1. Communication between the atmosphere and chamber 10 is cut off and compressed air from the trailer reservoir enters the chamber 10, causing the downward displacement of the emergency relay piston 6 and hence the braking of the trailer.

Coupling of the trailer can take place either with the trailer braked or released. In the first case, the handbrake release device is positioned to the left as shown in FIG. 1. Valve 15 is open and piston 6 is subjected to the compressed air from the trailer reservoir. At the moment that the ports A and M are connected to the emergency line and service line, respectively, air pressure for automatic operation is reestablished in chamber 8 and piston 6, in moving upwardly, causes the opening of the exhaust valve 4 and hence the brake releasing of the trailer. Simultaneously, the air pressure is reestablished in chamber 19 of cylinder 12, thus maintaining the position of the rod 14 as shown in FIG. 1.

In the case where the brake released trailer is coupled, the device is in a position to the right as viewed in FIG. 2 and chamber 10 is in communication with the atmosphere, while the valve 15 remains closed. Atmospheric pressure acts on both sides of the emergency relay piston 6, therefore, the push rod 7 does not act against the service piston 1. At the moment that the ports A and M are connected to the emergency air line and the service line, respectively, the air pressure is reestablished in chambers 8 and 19. The piston 13 is pushed toward the left, moving with it the rod 14 which opens valve 15. Communication between the trailer reservoir and chamber 10 is then reestablished. During this phase, the piston 6 does not sustain any displacement in respect to the preceding position, and thus maintains the pneumatic balance by means of the air pressure in chambers 8 and 10.

While I have shown and described an embodiment of my invention, it will be understood that numerous changes in size, design, shape, number and proportion of the various parts may be made, and particularly that the relationship of the various parts may be modified while retaining the advantages and essential functions of the structure without departing from the spirit of my invention as defined in the appended claims.

I claim:

1. Apparatus of the character described for pneumatically applying and releasing the brakes of a trailer comprising an automatic relay valve, said automatic relay valve including a housing, service piston means slidably mounted within the housing, a service brake line connected to the housing for supplying compressed air thereto for actuating the service piston means, a first port formed in the housing placing the automatic relay valve in communication with the atmosphere, a second port formed in the housing connecting the trailer braking sections to the automatic relay valve, a third port formed in the housing connecting the compressed air reservoir to the automatic relay valve, double-acting valve means including an inlet and an exhaust valve positioned within the housing adapted to be actuated by the service piston means whereby, when the inlet valve is in open position, compressed air is fed to the trailer braking sections from the trailer compressed air reservoir and when the exhaust valve is in open position, compressed air is exhausted from the braking sections to the atmosphere, an emergency relay piston slidably mounted within the housing and having one face forming an operating chamber with one end of the housing and an opposite face defining an air pressure chamber, an emergency air line connected to the pressure chamber for supplying fluid pressure to the opposite face of the emergency relay piston, a conduit connected between the trailer air reservoir port and the operating chamber for supplying fluid pressure to the one face of the piston, rod means carried by the emergency relay piston for actuating the service piston means, whereby the emergency relay piston is reciprocable within the housing to thereby actuate the inlet and exhaust valve means for placing the compressed air reservoir port in communication with the port connected to the braking sections of the trailer and for placing the port connected to the trailer braking sections in communication with the port connected to the atmosphere, in combination with a trailer manual brake release device and braking device including an auxiliary cylinder positioned within the operating chamber of the automatic relay valve and communicating with said emergency air line, an auxiliary piston reciprocable in said cylinder, a rod fixed to said auxiliary piston and having one portion extending in said operating chamber and an opposite portion protruding exteriorly of said housing to define an external control extremity, an auxiliary valve in said operating chamber opening and closing communication between said operating chamber and said trailer air reservoir port, resilient means urging said auxiliary valve toward its closed position, said auxiliary valve being positioned against said resilient means to its opened position by end pressure of the one portion of said rod, means establishing communication between said auxiliary cylinder and said pressure chamber to automatically actuate said auxiliary piston in response to a predetermined pressure in said pressure chamber whereby said rod is moved with said auxiliary piston to position said auxiliary valve in its opened position in response to compressed air flowing into said pressure chamber, and detent means for retaining said rod in a plurality of positions corresponding to the opened and closed positions of said auxiliary valve.

2. The combination as recited in claim 1, wherein said detent means includes spaced notches on said rod adjacent its external control assembly and a spring biased detent element carried by said housing for alternately engaging said notches.

3. The combination as recited in claim 1, wherein said rod has an axial bore therethrough for exhausting air from the operating chamber when its end is not in engagement with said auxiliary valve.

References Cited in the file of this patent

UNITED STATES PATENTS

| | | |
|---|---|---|
| 1,318,925 | Scott et al. | Oct. 14, 1919 |
| 2,322,823 | Brown | June 29, 1943 |
| 2,897,012 | Vorech | July 28, 1959 |